United States Patent [19]
Cartner

[11] Patent Number: 4,506,464
[45] Date of Patent: Mar. 26, 1985

[54] HYDRAULIC BREAKAWAY SYSTEM FOR MOBILE CUTTING APPARATUS
[76] Inventor: Jack O. Cartner, 1005 N. 8th St., Cambridge, Ohio 43725
[21] Appl. No.: 577,572
[22] Filed: Feb. 6, 1984

Related U.S. Application Data

[63] Continuation-in-part of Ser. No. 416,579, Sep. 10, 1982, Pat. No. 4,459,767, which is a continuation-in-part of Ser. No. 416,596, Sep. 10, 1982, which is a continuation-in-part of Ser. No. 416,642, Sep. 10, 1982, abandoned.

[51] Int. Cl.³ .............................................. E02F 9/08
[52] U.S. Cl. .......................................... 37/91; 56/11.9; 56/16.9; 56/10.4; 56/10.9; 37/92; 37/234; 37/236
[58] Field of Search ...................... 37/91–97, 37/81, 189, 236, 242, 234; 56/11.9, 16.9, 10.4, 10.9, 10.7, 15.2, DIG. 11; 15/3, 236 C

[56] References Cited

U.S. PATENT DOCUMENTS

| | | | |
|---|---|---|---|
| 2,319,464 | 5/1943 | Massa | 37/142 R |
| 2,588,004 | 2/1952 | Holmes | 56/25 |
| 2,685,751 | 8/1954 | Bain | 37/236 X |
| 2,770,893 | 1/1957 | Jacobs | 37/236 X |
| 2,831,275 | 4/1958 | Kimsey et al. | 37/124 |
| 2,976,663 | 3/1961 | Smith et al. | 56/10.9 X |
| 2,997,835 | 8/1961 | Stewart | 56/25 |
| 3,087,296 | 12/1962 | Cowles | 56/25.4 |
| 3,236,036 | 2/1966 | Bailey et al. | 56/DIG. 11 |
| 3,261,117 | 7/1966 | Shoemaker et al. | 37/92 |
| 3,267,653 | 8/1966 | Dawalt et al. | 56/10.9 |
| 3,308,611 | 3/1967 | Barber | 56/25 |
| 3,423,857 | 1/1969 | Ibisch | 37/43 |
| 3,453,756 | 7/1969 | Schroeder | 37/142 R |
| 3,648,391 | 3/1972 | Kabay et al. | 37/141 T |
| 3,653,193 | 4/1972 | Coughran | 56/10.7 |
| 3,683,522 | 8/1972 | Rousseau | 37/91 |
| 3,704,575 | 12/1972 | Daniel | 37/91 X |
| 3,715,872 | 2/1973 | Thompson, Jr. | 56/11.9 X |
| 3,797,211 | 3/1974 | Turner | 56/11.9 X |
| 3,878,905 | 4/1975 | Schaumann | 175/383 |
| 3,916,543 | 11/1975 | Poche | 37/236 X |
| 3,949,539 | 4/1976 | Cartner | 56/10.4 |
| 4,048,789 | 9/1977 | Cartner | 56/11.9 |
| 4,109,336 | 8/1978 | Ford | 15/3 |
| 4,193,217 | 3/1980 | Poche | 37/93 |
| 4,206,580 | 6/1980 | Truax et al. | 56/10.4 |

FOREIGN PATENT DOCUMENTS

| | | | |
|---|---|---|---|
| 150235 | of 1981 | Japan | 37/103 |
| 434158 | of 1974 | U.S.S.R. | 37/81 |
| 487208 | of 1975 | U.S.S.R. | 37/81 |
| 611967 | of 1978 | U.S.S.R. | 37/81 |
| 699119 | of 1979 | U.S.S.R. | 37/81 |

OTHER PUBLICATIONS

"Basic Graphical Kinematics", 1960, Kepler, pp. 2–7
Woods H–S105/6 Data Sheet.
Terrain King Versa Ditcher, Tiger Rotary Ditcher
Apr., 1980 Triumph Hydro-Clipper 6000 Series.

*Primary Examiner*—E. H. Eickholt
*Attorney, Agent, or Firm*—Fay & Sharpe

[57] ABSTRACT

A prime mover (A) has an arm assembly (B) pivotally connected thereto. A cutting assembly (C) is operatively connected with the arm assembly to be positioned thereby. The arm assembly is connected to the tractor to pivot about both vertical and horizontal axes such that the cutting means is positionable fore-and-aft as well as up and down. A hydraulic control circuit (D) controls the position of the arm assembly. The control circuit includes a first through-rod-type hydraulic cylinder (60) which includes a piston (62) slidably disposed therein to divide the cylinder into two equidiameter chambers (64, 66). A through-rod (68) is connected with the piston and extends through both chambers of the cyylinder. The hydraulic cylinder and the piston rod each have the same diameter in both chambers such that as the piston moves, one of the chambers draws the same amount of fluid as the other chamber discharges. A unidirectional pressure relief valve (70) connects the two chambers to allow fluid to flow from one chamber to the other when the pressure differential therebetween exceeds a first preselected pressure, but blocks fluid flow in the opposite direction. This enables the arm assembly to break away in one direction. Additional through-rod-type hydraulic cylinders (80, 90) control the position of arms within the arm assembly and the position of the cutting apparatus. Additional one-way pressure relief valves (84, 94) are connected with the other hydraulic cylinders to allow the arm assembly and cutting assembly to break away.

13 Claims, 6 Drawing Figures

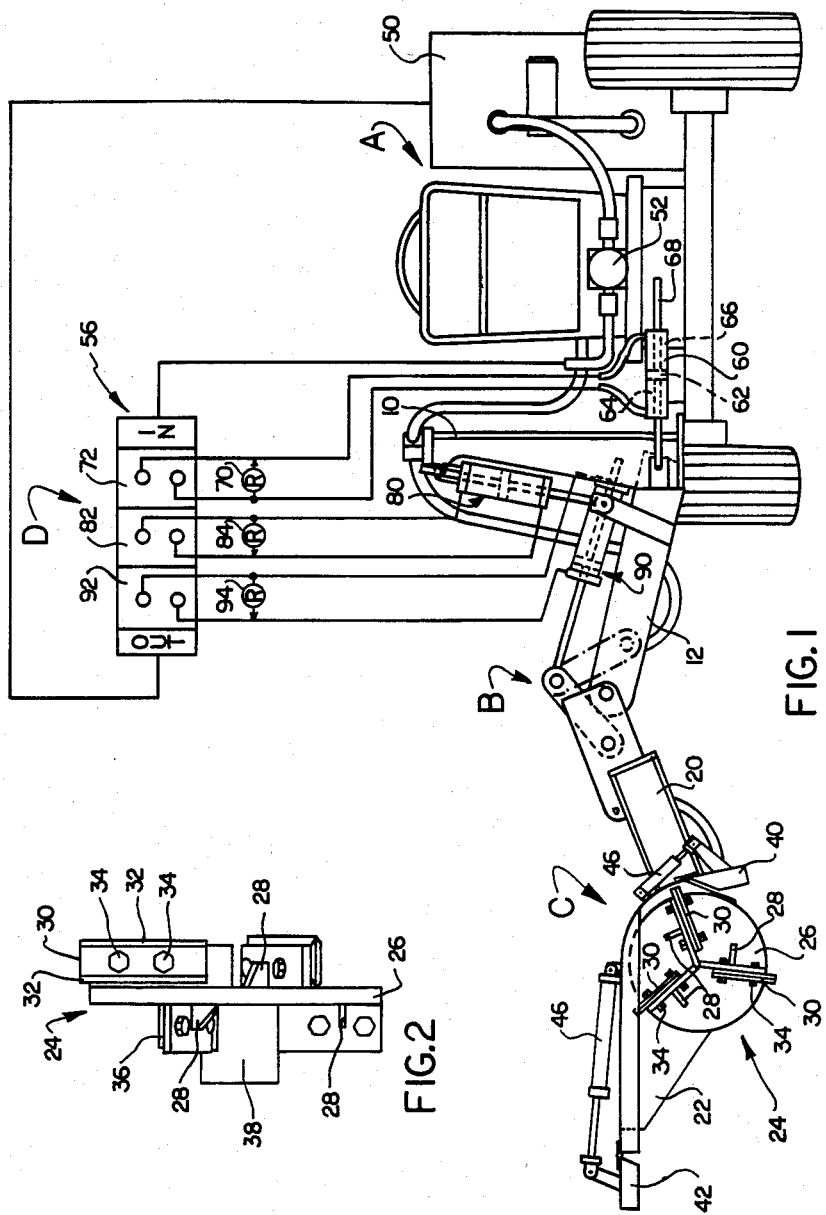

HYDRAULIC BREAKAWAY SYSTEM FOR MOBILE CUTTING APPARATUS

BACKGROUND OF THE INVENTION

The present invention is a continuation-in-part of applications Ser. No. 416,579, now U.S. Pat. No. 4,459,767 which is a continuation-in-part of Ser. No. 416,596, which is a continuation-in-part of Ser. No. 416,642, all filed September 10, 1982, in the name of Jack O. Cartner.

The present invention relates to the art of roadside maintenance. The invention finds particular application in conjunction with tractor mounted ditchers, mowers, sickle bars, and other cutting apparatus and will be described with particular reference thereto.

Heretofore, various cutting tools have been mounted to tractors or other prime movers by a variety of arm assemblies. The arm assemblies hold the cutting apparatus to the side of the tractor for cutting away vegetation or earth as may be required for road maintenance. Hydraulic cylinders were provided to control the forward and aft angular orientation of the arm and cutter relative to the tractor. One or more height and distance hydraulic cylinders were provided to raise and lower the cutting apparatus and to move it toward and away from the tractor.

From time-to-time, stumps, fence posts, large rocks, and the like were obscured from the driver's view by vegetation or the like. As is to be appreciated, impacting a relatively immovable object with the cutting tool was likely to damage one or more of the cutting tool, the arm, and the tractor. One solution to this problem was illustrated in U.S. Pat. No. 3,949,539, issued April, 1976 to the inventor herein. Although relatively successful, the hydraulic circuit therein was relatively complex. It provided a hydraulic cylinder for swinging the cutting head fore-and-aft. However, because the hydraulic piston rod which extends between the hydraulic cylinder piston to the arm assembly has finite size, the cavities on opposite sides of the piston were unequal in size. As the arm moved, the amount of fluid supplied to one cavity was different from the amount of fluid discharged from the other. This difference in fluid flow required a relatively complex hydraulic circuit. Each side of the cylinder had to be provided with the ability to draw fluid directly from a fluid reservoir to replace shortfall and to discharge an excess back to the tank. Of course, providing free access between both sides of the cylinder and the tank would render the cylinder inoperative. Accordingly, a relatively complex system of relief and check valves was required to allow the arm to swing away under excess pressure but still enable the arm to be selectively positioned. Further, the earlier Cartner system only provided for fore-and-aft breakaway movement. No provision was made for lifting the arm or allowing it to move toward or away from the tractor in response to impact with a relatively immovable object.

In accordance with the present invention, there is provided a new and improved hydraulic breakaway circuit which overcomes the above referenced problems and others.

SUMMARY OF THE INVENTION

In accordance with the present invention, there is provided a hydraulic breakaway circuit for arms which interconnect a prime mover and a cutting apparatus. The hydraulic system includes a through-rod-type hydraulic cylinder for controlling the position of the arm. Opposite ends of the hydraulic cylinder are connected with a position control valve. A first one-way, pressure relief valve is connected directly between the ports of the valve such that under a preselected force sufficient to open the one-way relief valve, hydraulic fluid can flow from one side of a hydraulic cylinder piston to the other to allow the arm to breakaway in a first direction.

In accordance with a more limited aspect of the invention, a second one-way, pressure relief valve is connected in parallel with the first pressure relief valve to allow fluid to pass therethrough in response to a second preselected pressure, whereby the arm can breakaway in the second direction under a second preselected force. This allows the arm to breakaway with different forces in each direction.

In accordance with another aspect of the present invention, there is provided at least one height or distance adjustment hydraulic cylinder for selectively adjusting at least one of the height and spacial distance of the cutting apparatus relative to the tractor, the height and distance hydraulic cylinder is again a through-rod-type cylinder with hydraulic chambers on opposite sides of the hydraulic piston. A one-way, relief valve is connected directly between the hydraulic chambers to allow the arm to be raised or moved relative to the tractor in response to encountering a preselected force.

A primary advantage of the present invention is that it simply, yet reliably, protects cutting apparatus and their mounting arms from damage from impact with relatively immovable objects.

Another advantage of the present invention is that the hydraulic breakaway circuit is relatively simple and easy to maintain and manufacture.

Yet another advantage of the present invention is that it allows the cutting apparatus to breakaway vertically.

Still further advantages of the present invention will become apparent upon reading and understanding the following detailed description of the preferred embodiments.

BRIEF DESCRIPTION OF THE DRAWINGS

The invention may take form in various parts and arrangements of parts. The drawings are only for purposes of illustrating a preferred embodiment of the invention, and are not be construed as limiting it.

FIG. 1 is a diagrammatic illustration of a hydraulic breakaway system in accordance with the present invention in conjunction with a front elevational view of a ditching head-type cutting assembly;

FIG. 2 is a side elevational view of the ditching head of FIG. 1;

DETAILED DESCRIPTION OF THE PREFERRED EMBODIMENTS

Figure 3:
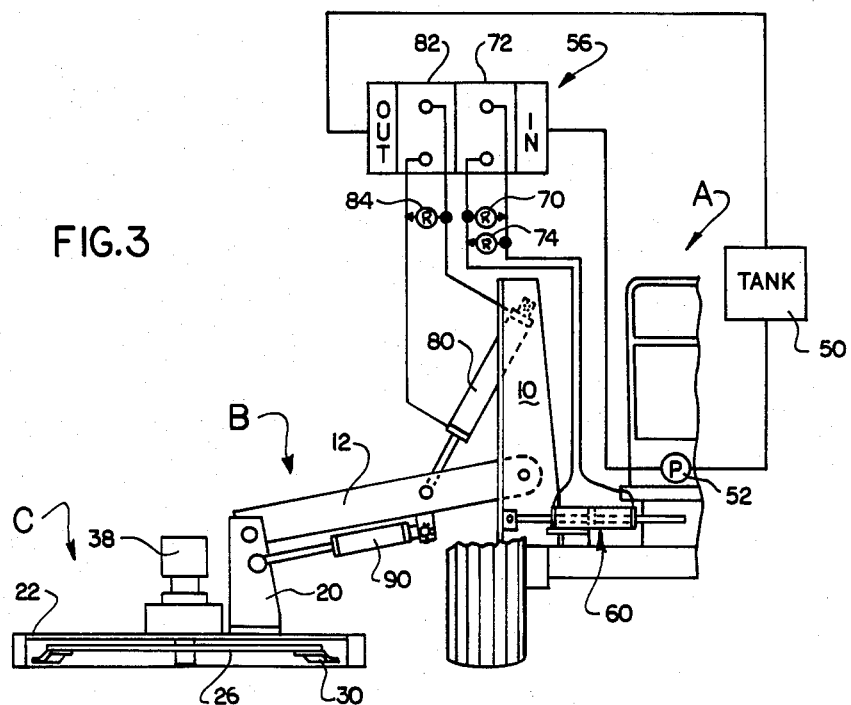
FIG. 3 is an alternate embodiment of the present invention in which the cutting means is a rotary mower.

With reference to FIGS. 1, 3, 4, 5, and 6, a prime mover A such as a tractor has an arm assembly B pivotally connected thereto. A cutting assembly C is operatively connected with the arm assembly to be positioned thereby. The arm assembly is pivotally connected to the tractor in both horizontal and vertical planes such that the cutting means is positionable fore-and-aft, as well as up and down. A hydraulic control circuit D controls the position of the arm assembly and, preferrably, controls the cutting means.

Referring first to FIG. 1, the arm assembly B includes a generally vertical member or post 10 which is mounted to the prime mover to pivot about a vertical axis. This permits the arm and cutting apparatus to rotate or swing fore-and-aft. A first boom arm 12 is pivotally connected with the post 10 to pivot fore-and-aft while remaining in a vertical plane. The cutting apparatus C is pivotally connected with a second end of the first arm 12.

With continuing reference to FIG. 1, and secondary reference to FIG. 2, the cutting apparatus C includes a mounting arm 20 which is pivotally connected with the arm assembly and a housing 22 connected therewith. A cutting means 24 includes a rotating member 26 on which a plurality of blade mounting means or brackets 28 are fixedly attached to the leading and trailing faces thereof. A plurality of cutting blades 30 are mounted to the mounting brackets on the leading face of the rotary cutting member. Each blade has oppositely disposed tapered edges 32 which taper equally from opposite faces of the blade and extend the length thereof. The tapered edges are symmetric about the plane of the blade such that the blade may be reversed with either face contacting the mounting bracket 28. The blade has a plurality of symmetrically disposed apertures through which mounting bolts 34 extend to mount the blades to the mounting bracket. The mounting apertures are symmetric about both longitudinal and transverse axes of the blades such that the blade may be reversed both end-to-end and side-to-side. The symmetry permits the blade to be mounted in four positions with each of its four corners in the outermost leading corner which receives the most wear. The symmetry allows the blade to be reversed four times increasing blade life four-fold. A plurality of clean-out paddles 36 are mounted to the trailing face mounting brackets 28.

With continued reference to FIG. 1, the ditcher head includes a hydraulic motor 38 for rotating the rotatable member 26 in either direction. Flaps 40 and 42 on the housing selectively direct the discharged earth from the cutting blades and paddles. Control means 44 and 46 selectively control the angular position of the flaps.

The hydraulic circuit D includes a hydraulic fluid reservoir 50 and a hydraulic fluid pump 52 which pumps hydraulic fluid from the reservoir to a hydraulic control valve assembly 56. The hydraulic control valve assembly is connected back to the reservoir by a return line.

A first or swing control hydraulic cylinder 60 is operatively connected between the prime mover and the vertical post 10 for selectively rotating the post about the vertical axis. The first cylinder 60 is a through-rod-type cylinder. That is, the cylinder includes a piston 62 slidably disposed therein. The piston divides the cylinder into two equal diameter chambers 64 and 66. A through-rod 68 is pivotally connected at one end with the vertical arm, is fixedly connected centrally thereof with the piston, and extends through the cylinder out the opposite wall end. Because the hydraulic cylinder and the piston rod each have the same diameter in both chambers, as the piston moves from one side toward the other, one of the chambers draws the same amount of fluid as the other chamber discharges. A unidirectional pressure relief valve 70 extends between the chambers 64, 66 of the first hydraulic cylinder. The single unidirectional relief valve 70 is oriented such that the arm can swing rearward in response to engaging an object. The hydraulic relief valve allows fluid to flow from the forward urging chamber 64 to the rearward urging chamber 66 when the pressure differential between the chambers exceeds a first preselected breakaway pressure. The first preselected pressure is selected in accordance with the lever arm provided by the arm assembly and the size of a desired rearward breakaway force on the cutting apparatus. After the cutting assembly impacts an object and the arm breaks away, the operator returns it to its pre-impact position with a fore-aft or first control valve 72. The first control valve 72 selectively creates the appropriate pressure differential in chambers 64 and 66 to cause the arm and cutting means to swing forward or aft as may be desired. Having positioned the arm, the control valve balances the pressure differential to hold the arm fixed.

A second or height adjusting hydraulic cylinder 80 controls the orientation of the first arm 12. The second hydraulic cylinder is pivotally connected between the vertical post 10 and the first arm 12 to control the angular position or height of the first arm relative to the prime mover. The second hydraulic cylinder 80 is again of the through-rod-type. It includes a through-rod which is pivotally connected at one end with the second arm, fixedly connected centrally with a piston, and extends through the opposite end of the cylinder. The cylinder itself is pivotally connected with the vertical post. A height adjusting or second control valve 82 is connected with the equidiameter chambers of the second hydraulic cylinder 80. A one-way, pressure relief valve 84 is connected directly across the second hydraulic cylinder chambers to allow fluid to flow from one to the other in response to an upward pressure exceeding a preselected second or upward breakaway pressure or force.

A third or relative distance hydraulic cylinder 90 interacts with a second hydraulic 80 for selectively adjusting the height and relative distance between the cutting apparatus and the prime mover. The third hydraulic cylinder is pivotally connected at one end with the second arm and includes a through-rod which is pivotally connected with the cutting apparatus. A piston again divides the hydraulic cylinder into fore-and-aft equidiameter chambers which are connected with a third relative distance control valve 92. A one-way, pressure relief valve 94 is connected directly across the chambers of the third cylinder and across the ports of the third control valve such that in response to a third preselected pressure differential in the third cylinder chambers, fluid is permitted to flow therebetween allowing the cutting apparatus to move upward and outward relative to the first arm and the prime mover.

In the embodiment to FIG. 3, like elements with the embodiment of FIGS. 1 and 2 are denoted by the same reference numeral. For simplicity of explanation, reference is made to the description of FIG. 1 for the description of like parts. The cutting apparatus C is pivotally connected by an arm 20 with a first arm 12 of the arm assembly. The cutting apparatus includes a hydraulic motor 38 which is mounted on a housing 22 to rotate a member 26 to which a plurality of cutting elements 30 are mounted.

The hydraulic circuit D includes a first or fore-aft through-rod-type hydraulic cylinder 60 for rotating the arm assembly and cutting apparatus about a vertical axis under the control of a first or fore-aft control valve 72. A one-way, pressure relief valve 70 permits the arm assembly and cutting apparatus to swing rearward in response to a preselected first or rearward breakaway pressure or force. Another one-way, pressure relief valve 74 allows the arm assembly and cutting apparatus to swing forward in response to a preselected second or forward breakaway pressure or force. The force to cause the arm assembly and cutting apparatus to swing or breakaway to the forward and to the rearward directions may be the same or different. A second through-rod-type hydraulic cylinder 80 positions the first arm 12 under the control of a second hydraulic control valve 82. A one-way, relief valve 84 allows the second arm to breakaway upward in response to a preselected force or pressure.

Figure 4:
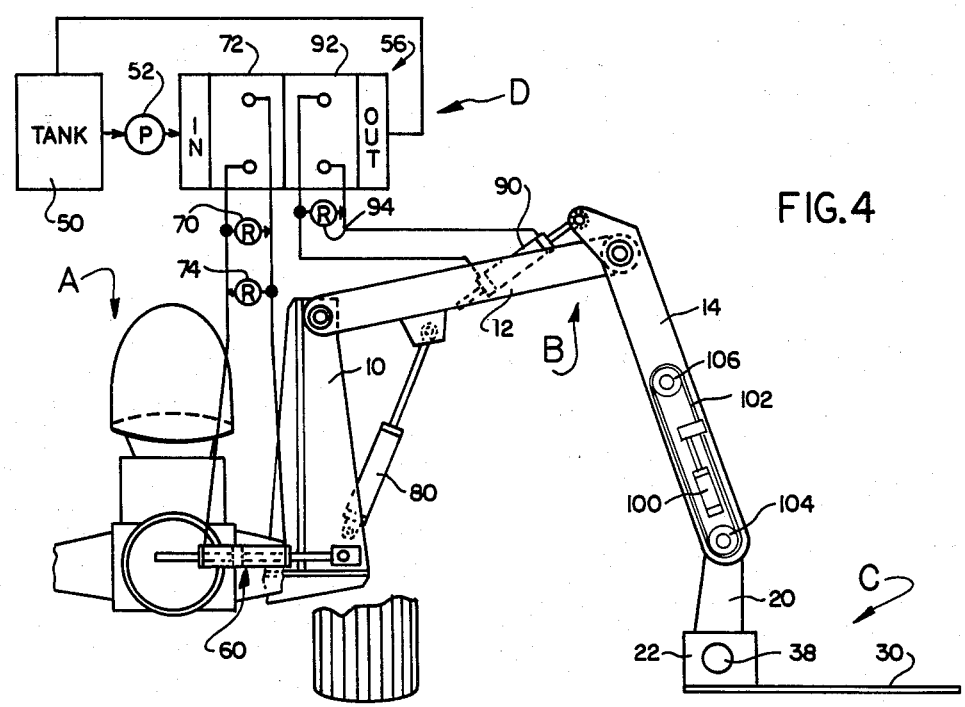
FIG. 4 is yet another alternate embodiment of the present invention which as a bi-directional swinging breakaway and a unidirectional height breakaway and in which the cutting apparatus is a sickle bar.

In the embodiment of FIG. 4, like elements with the embodiment of FIGS. 1 and 3 are denoted by the same reference numerals. For simplicity of explanation, reference is again made to the description of like parts in the preceding embodiments, which description is incorporated by reference herein. In the embodiment of FIG. 4, the arm assembly B includes a first arm 12 which is pivotally mounted to a vertical post 10 and a second arm 14 which is pivotally mounted to the first arm. A fourth hydraulic cylinder 100 selectively rotates a chain 102 about sprockets 104 and 106. The cutting apparatus C is fixedly connected with sprocket 104 by a cutting arm 20 to be rotated therewith. In the embodiment to FIG. 4, the cutting apparatus is a sickle bar.

The hydraulic control circuit D again includes a first or fore-aft control through-rod-type cylinder 60 which is connected with a control valve 72 to control the position of the arm assembly B and the cutting apparatus C relative to a vertical axis. One-way, pressure relief valves 70 and 74 selectively permit the arm assembly and cutting apparatus to breakaway aft and fore, respectively, under preselected breakaway forces. A third or distance control through-rod-type hydraulic cylinder 90 controls the relative position of the second arm 14 relative to the first arm 12 under the control of a third or displacement control valve 92. A one-way, pressure relief valve 94 permits the second arm to pivot upward relative to the first arm in response to the cutting apparatus C contacting an obstruction with a preselected minimum breakaway force.

Figure 5:
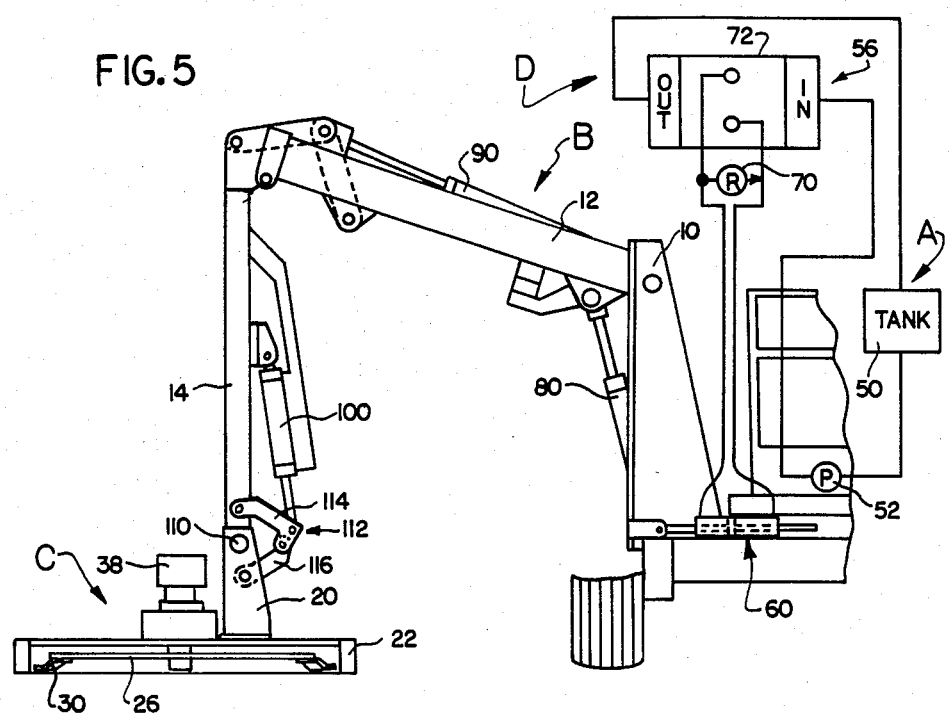
FIG. 5 is another alternate embodiment of the present invention.

In the embodiment of FIG. 5, like elements with the preceding embodiments are again denoted by the same reference numerals. For simplicity of explanation, reference is again made to the preceding embodiments for the description of the like elements. A fore-to-aft, first through-rod-type hydraulic cylinder 60 is controlled by a valve 72. A one-way, relief valve 70 is connected across the chambers of the first hydraulic cylinder 60 to permit the arm assembly and cutting apparatus to pivot rearward in response to the cutting apparatus impacting an object.

The cutting apparatus C is pivotally connected by a pivot 110 with the arm assembly. A kinematic chain, more precisely a four-bar linkage assembly 112, converts longitudinal extensive movement of a fourth hydraulic cylinder 100 into relative rotational movement between the second arm 14 and the cutting apparatus arm 20. The fourth hydraulic cylinder 100 is pivotally connected with a drive link 114 which, in turn, is pivotally connected with the second arm 14 such that the second arm functions as a frame link. The generally L-shaped drive link 114 converts the extensive movement of the fourth cylinder 100 into rotational movement. A floating link 116 is pivotally connected at one end with the drive link 114 and at its other end with the cutting apparatus arm 20 such that the cutting apparatus arm functions as a follower arm. The floating link 116 multiplies rotational movement of the drive link. The four-bar linkage assembly enables the cutting apparatus to pivot a full 180° relative to the second arm 14. This enables the cutting face of the cutting apparatus to be positioned facing toward the tractor, away from the tractor, or at any angular position therebetween. By rotating the second arm relative to the first arm, the angular position of the cutting face can be rotated still further. This enables the cutting apparatus to be utilized to trim vertical surfaces, the downward facing portion of overhanging trees, and the like. The four-bar linkage allows wide degrees of angular rotation while maintaining the cylinder 100 and the linkage closely adjacent the second arm 14 to void interference with the vegetation being trimmed.

Figure 6:
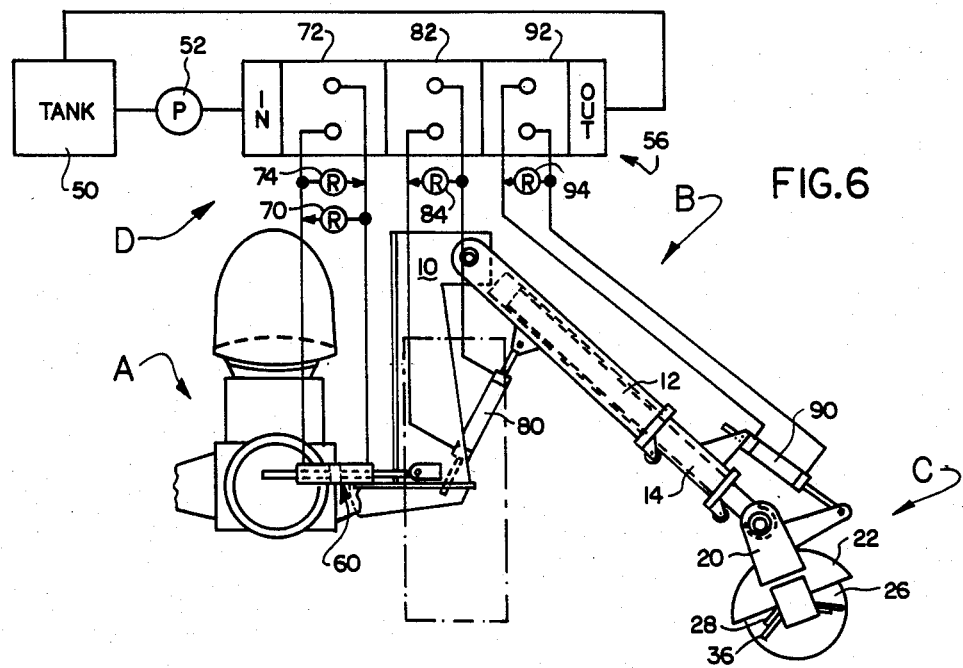
FIG. 6 is yet another alternate embodiment of the present invention including a bi-directional and two unidirectional breakaway systems in which the cutting apparatus is a ditching head.

FIG. 6 illustrates yet another alternate embodiment of the present invention. Again, like elements are denoted by the same reference numerals as in the preceding embodiments, and reference is made to the description of the preceding embodiments for the description of the like elements. The arm assembly B includes a first arm 12 which is pivotally mounted to a vertical post 10 and a second arm 14 which is telescopically received within the first arm. Optionally, a third arm may be telescopically received within the second arm. Telescopic movement of the arms is controlled by hydraulic expansion cylinders, not shown, which may have similar breakaway constructions. The cutting apparatus C is a ditching head.

The hydraulic circuit D includes a first or fore-aft through-rod hydraulic cylinder 60 for rotating the arm and cutting apparatus about a vertical axis under the control of a first or fore-aft control valve 72. A pair of parallel connected one-way pressure relief valves 70, 74, permit the arm assembly to break away forward and rearward in response to preselected breakaway pressures. A second or vertical control through-rod-type hydraulic cylinder 80 controls the angular orientation of the first and second arms under the control of a second or height control valve 82. A one-way relief valve 84 selectively allows the arm assembly to break away upward in response to a preselected force or pressure. A third or cutting apparatus angular orientation control cylinder 90 is caused by second or cutting apparatus angular control valve 92 to adjust the angular orientation of the ditcher head or other cutting apparatus. A one-way pressure relief valve 94 selectively allows the cutting apparatus to rotate outward and upward in response to a preselected breakaway force or pressure.

The invention has been described with reference to the preferred embodiments. Obviously, modifications and alterations will occur to others upon reading and understanding the preceding detailed description. It is intended the invention be construed as including all such alterations and modifications insofar as they come within the scope of the appended claims or the equivalents thereof.

Having thus described the preferred embodiments, the invention is now claimed to be:

1. A mobile cutting apparatus comprising:
   (a) a prime mover;
   (b) an arm assembly operatively connected with the prime mover such that the arm assembly undergoes rotational movement relative to the prime mover;
   (c) a cutting assembly operatively connected with the other end of the arm assembly;
   (d) a hydraulic breakaway circuit including:
      (i) a first through-rod-type hydraulic cylinder operatively connected with the arm assembly for controlling a rotational position of the arm assembly relative to the prime mover, the first cylinder including a cylinder housing, a piston slidably received within the cylinder housing dividing it into first and second chambers such that increasing the pressure in one chamber relative to the pressure in the other chamber causes the piston to move, and a through-rod extending from one end of the housing, through and fixedly attached to the piston, and through the other end of the housing, the rod having the same outer diameter in both the first and second chambers and the housing having the same inner diameter in both the first and second chambers such that the amount of fluid displaced from one of the chambers as the piston moves is the same as the amount of fluid required to maintain the other chamber filled;
      (ii) a hydraulic fluid control valve for controlling the relative pressure in the first and second chambers of the first hydraulic cylinder, the first hydraulic control valve having a first port in fluid connection with the first chamber and a second port in fluid communication with the second chamber;
      (iii) a first one-way, relief valve operatively connected between the first and second chambers for allowing fluid to flow from the first chamber to the second chamber when the pressure in the first chamber exceeds the pressure in the second chamber by a first preselected pressure, the first pressure relief valve prohibiting the flow of hydraulic fluid from the second chamber to the first chamber therethrough, whereby in response to the cutting assembly contacting a relatively immovable object which tends to cause the arm assembly to rotate in a first direction until the pressure differential exceeds the first preselected pressure and the first pressure relief valve permits fluid to flow between the hydraulic cylinder chambers allowing the arm assembly to rotate;
      (iv) a fluid reservoir; and,
      (v) a hydraulic fluid pump for pumping hydraulic fluid from the hydraulic fluid reservoir to the first hydraulic valve.

2. The mobile cutting apparatus as set forth in claim 1 further including a second one-way, pressure relief valve connected in parallel with the first one-way relief valve, the second relief valve permitting fluid to flow from the second chamber to the first chamber when the pressure in the second chamber exceeds the pressure in the first chamber by a second preselected pressure such that in response to the cutting apparatus contacting an object with sufficient force, the second one-way pressure relief valve permits the arm assembly to break away and yield in a second direction.

3. The mobile cutting apparatus as set forth in claim 1 wherein the through-rod-type hydraulic cylinder rotates the arm assembly about a vertical axis.

4. The mobile cutting apparatus as set forth in claim 3 wherein the through-rod-type hydraulic cylinder is connected with the arm assembly in such a manner that the first one-way, pressure relief valve permits the arm assembly to pivot rearward when an object is impacted with sufficient force to cause the first preselected pressure difference between the first and second chambers.

5. The mobile cutting apparatus as set forth in claim 4 wherein the arm assembly includes a first arm and the hydraulic circuit further includes a second through-rod-type hydraulic cylinder operatively connected with the arm assembly for rotating the first arm about a horizontal pivot, the second through-rod hydraulic cylinder including a second hydraulic cylinder fluid housing in which a second piston is slidably received dividing the housing into two chambers and a through-rod attached to the piston and extending through the two chambers;
   a second hydraulic valve operatively connected with the pump means, the second hydraulic valve having a pair of outlet ports, each of the outlet ports being connected with one of the second hydraulic cylinder chambers; and,
   a second, one-way pressure relief valve connected between the second hydraulic cylinder two chambers for allowing fluid to pass from one of the chambers to the other when the pressure differential therebetween exceeds a second preselected pressure.

6. The mobile cutting apparatus as set forth in claim 5 wherein the second hydraulic cylinder is connected with the first arm in such a manner that the second preselected pressure between the second hydraulic cylinder chambers is achieved by urging the first arm upward with sufficient force.

7. The mobile cutting apparatus as set forth in claim 5 wherein the cutting assembly includes an arm pivotally connected to the arm assembly to rotate relative thereto about a horizontal axis and wherein the hydraulic circuit further includes:
   a third through-rod-type hydraulic cylinder operatively connected with the arm assembly for rotating the cutting assembly arm relative to the arm assembly, the third through-rod hydraulic cylinder including a third hydraulic cylinder fluid housing in which a piston is slidably received dividing the housing into two chambers and a through-rod attached to the piston and extending through the two chambers;
   a third hydraulic valve operatively connected with the pump means, the third hydraulic valve having a pair of outlet ports, each of the outlet ports being connected with one of the third hydraulic cylinder chambers;
   a third, one-way pressure relief valve connected between the third hydraulic cylinder chambers for allowing fluid to pass from one to the other when the pressure difference between the third cylinder chambers exceeds a third preselected pressure.

8. The mobile cutting apparatus as set forth in claim 1 further including a second hydraulic cylinder operatively connected between the arm assembly and the cutting apparatus, the second through-rod hydraulic cylinder including a second hydraulic cylinder fluid housing in which a second piston is slidably received dividing the second cylinder housing into two chambers and a second through-rod attached to the second piston and extending through the two second cylinder chambers;

a second hydraulic control valve operatively connected with the pump means, the second hydraulic valve having a pair of outlet ports, each of the outlet ports being connected with one of the second cylinder chambers; and, a second, one-way pressure relief valve connected between the two second cylinder chambers for allowing fluid to pass from one to the other when a pressure differential between the second cylinder chambers exceeds a second preselected pressure.

9. The mobile cutting apparatus as set forth in claim 1 wherein the cutting assembly includes:

a housing which is mounted to the arm assembly for rotation about a horizontal axis;

a rotatable member which is mounted to rotate relative to the housing; and, cutting blades mounted on the rotatable member to be rotated therewith.

10. The mobile cutting apparatus as set forth in claim 9 wherein the rotating member is mounted to rotate in a substantially vertical plane, the rotating member including brackets for mounting a plurality of the blades on a leading face thereof and for mounting a plurality of clean-out paddles on a trailing face thereof.

11. The mobile cutting apparatus as set forth in claim 10 wherein each of the cutting blades has tapered edges extending along opposite sides thereof and a plurality of mounting apertures for mounting the blade to the brackets, the tapered edges and apertures being disposed such that the blade is symmetric about a plane extending centrally therethrough, about a longitudinal axis, and about a transverse axis such that the blade is rotatable to four different positions to quadruple blade life.

12. The mobile cutting apparatus as set forth in claim 9 wherein the cutting apparatus is connected with the arm assembly by a four-bar mechanism such that the cutting assembly is adapted to be rotated 180° relative to the arm assembly by the four-bar mechanism.

13. The mobile cutting apparatus as set forth in claim 12 wherein the arm assembly includes a plurality of pivotally connected arms, one of the arms being pivotally connected with a cutting assembly arm, and, wherein the four-bar mechanism includes an L-shaped drive link which is pivotally connected with the arm assembly one-arm such that the one arm functions as a frame link, and a follower link pivotally connected between the drive link and the cutting assembly arm such that the a cutter assembly arm functions as a follower arm and a hydraulic cylinder connected between the one arm and the drive link such that extension and contraction of the hydraulic cylinder pivots the cutting apparatus about the arm assembly.

* * * * *